United States Patent

[11] 3,624,525

[72] Inventor William G. Smith
Loveland, Colo.

[21] Appl. No. 878,345
[22] Filed Nov. 20, 1969
[45] Patented Nov. 30, 1971
[73] Assignee Hewlett-Packard Company
Palo Alto, Calif.

[54] TRUE RMS CONVERTER
4 Claims, 2 Drawing Figs.

[52] U.S. Cl. .......... 328/144, 324/106, 328/3
[51] Int. Cl. .......... G06g 7/20
[50] Field of Search .......... 324/105, 106, 118; 328/3, 144

[56] References Cited
UNITED STATES PATENTS
2,857,569 10/1958 Gilbert et al. .......... 324/106

*Primary Examiner*—Donald D. Forrer
*Assistant Examiner*—B. P. Davis
*Attorney*—A. C. Smith

ABSTRACT: A pair of thermocouples having elements connected respectively to receive an applied signal and the output signal of an amplifier are connected to apply the resultant thermocouple signals to the input of the amplifier in polarity opposition. An additional feedback signal which varies directly with the output level of the amplifier and which has a square-law characteristic similar to the thermocouple elements is applied to the input of the amplifier to reduce the effects of signal level on the response time of the circuit and allow ultralow signal frequencies to be accurately measured.

INVENTOR
WILLIAM G. SMITH

BY A. C. Smith
ATTORNEY

TRUE RMS CONVERTER

BACKGROUND AND SUMMARY OF THE INVENTION

Certain known thermocouple converter circuits use a pair of thermocouples connected to apply thermocouple signals to an amplifier in polarity opposition where the heater for one thermocouple receives applied signal and the heater for the other thermocouple receives the output from the amplifier. If the thermocouple-heater combinations of the pair have matched characteristics, the output of the amplifier is linearly related to the RMS value of the applied signal. Circuits of this type are described in the literature (see, for example, U.S. Pat. No. 3,262,055 entitled TRUE RMS VOLTMETERS, issued on July 19, 1966, to Gregory Justice). One disadvantage commonly encountered in circuits of this type is that the loop gain varies in response to signal level due to the nonlinearity of the thermocouple included in the feedback loop. The thermocouple exhibits square-law conversion characteristics and thus provides a thermocouple signal which is related to the square of the signal applied to the heater. This causes undesirable changes in loop gain and concomitant changes in circuit response as a function of output signal level.

Accordingly, the present invention uses thermocouples in the input and feedback paths around an amplifier and also includes an integrating feedback circuit for maintaining circuit response time relatively constant over a wide dynamic range of operating signal levels and for extending the operating range of the present circuit to signal frequencies lower than are possible using only the thermocouples. The effect of this feedback circuit varies as a function of frequency and signal level to provide overall signal response characteristics that are relatively constant over a wide dynamic range of operating signal levels and frequencies.

DESCRIPTION OF THE PREFERRED EMBODIMENT

Figure 1:
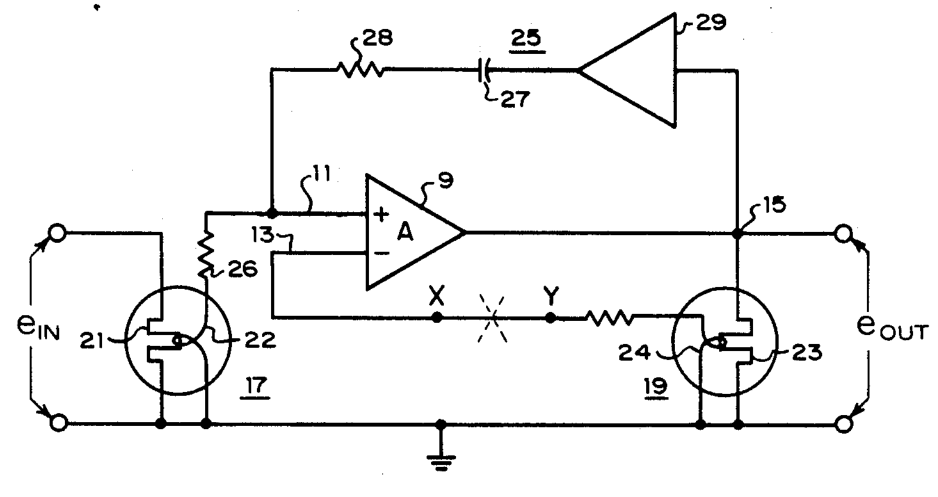
FIG. 1 is a schematic diagram of the preferred embodiment of the present invention.

Referring now to the schematic diagram of FIG. 1, there is shown a differential amplifier 9 having a pair of inputs 11 and 13 and an output 15. A pair of thermoelements 17 and 19 each includes a thermocouple 22, 24 connected to an input 11, 13 of the amplifier 9 and an electrical heater 21, 23 for elevating the temperature of the respective thermocouple in response to signal applied to the heater 21, 23. Thermocouple elements of this type which may be signal-heated directly or indirectly are described in U.S. Pat. application Ser. No. 795,136 filed on Dec. 16, 1968, now issued as U.S. Pat. No. 3,535,523 as a divisional application of Ser. No. 613,289 filed on Feb. 1, 1967, now issued as U.S. Pat. No. 3,535,523. Signal applied to the input heater 21 produces a signal in thermocouple 22 which is applied to the noninverting input of amplifier 9. The signal conversion characteristic for the thermoelement 17, 19 is approximately a square-law function wherein the thermocouple signal varies as the square of signal applied to the associated heater 21, 23. Thus, the output of amplifier 9 tends to vary nonlinearly with input signal level. However, the heater 23 of thermoelement 19 is connected to receive the output 15 of amplifier 9 and the associated thermocouple 24 is connected to the phase-inverting input 13 of amplifier 9 to supply feedback signal which varies nonlinearly with the level of signal at the output 15 of amplifier 9. It should be noted that if thermoelements 17 and 19 have matched square-law conversion characteristics, then the nonlinearity of the feedback signal supplied by thermoelement 19 compensates for the nonlinearity of the signal applied to the amplifier 9 by thermoelement 17 to produce an output signal $e_{out}$ at 15 that varies linearly with the true RMS value of input signal $e_{in}$ applied to heater 21.

The conversion of a signal applied to the heater of thermoelement 17 to a DC output representative of the root-mean-square (RMS) value of the applied signal may be described by a well-known mathematical expression that includes the integral of the applied signal function over a complete cycle of the signal. The constants for the RMS conversion for a range of signal periods are related in part to the thermal mass of the heater 21 and to other factors which change as the period of the applied signal increases (i.e., as the signal frequency decreases) beyond a certain limit. Thus, at low-operating frequencies the DC output from thermocouple 22 tends to follow the amplitude excursions of the applied signal as the thermocouple ceases to provide effective integration of the applied signal over a complete signal cycle. In practice, the operating frequency at which this effective signal integration over a complete cycle ceases to occur is typically about three to ten cycles per second and is manifested by fluctuations in output level or meter indication, or the like, below such input signal rate.

Figure 2:
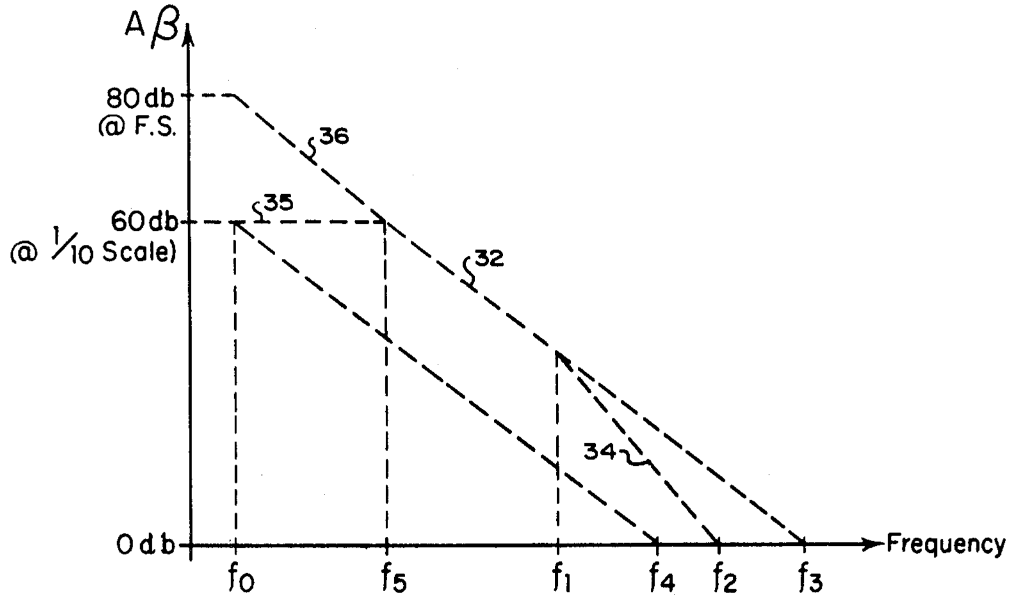
FIG. 2 is a graph showing the open loop gain characteristics between circuit points X and Y in the embodiment of FIG. 1.

In accordance with the illustrated embodiment of the present invention, the frequency range over which the effective full-cycle integration and, hence, RMS conversion may be accomplished with a given thermoelement is extended to lower frequencies by the addition of an integrating feedback circuit 25, as shown in FIG. 1. This circuit includes a capacitor 27 and resistor 28 serially connected between the output of nonlinear gain stage 29 and the input 11 of amplifier 9. The open loop gain (at full-scale signal level) from circuit point X to point Y around circuit 9 and 19 and around circuit 9, 29, 27 and 28 effectively multiply the capacitance of capacitor 27 in a known manner and thereby provide a pole of response at a frequency that is several decades lower than the pole frequency $f_1$ provided by the thermoelements alone, as shown in the graph of FIG. 2. This pole of response is determined primarily by the equivalent resistance 26 of the thermocouple 22 and resistor 28 and by the value of capacitance 27 effectively multiplied by the loop gain at full scale of the circuit 9, 19, 13 plus the loop gain of the circuit 29, 27 and 28. This pole of response may therefore be established at a frequency $f_o$ of about 0.002 hertz compared with the typical frequency $f_1$ of about 10 hertz. The asymptote of the loop response characteristic 32 thus decreases with frequency at the rate of about 20 decibels (db.) per decade of frequency from the pole frequency $f_o$ to the pole frequency $f_1$ that is contributed by a thermoelement 19. However, in order to insure loop stability to the gain-crossover point (i.e., where asymptote crosses 0 db.), a zero of response may be established at the frequency $f_1$ where thermoelement 19 contributes a pole of response. The net effect of a pole and a zero established at about the frequency $f_1$ is that the asymptote of loop response 32 continues decreasing with frequency at the one-pole rate of 20 db. per decade compared with the two-pole rate of 40 db. per decade (asymptote 34) which would be a conditionally stable loop in the absence of a zero established at frequency $f_1$. This zero of response is established primarily by resistor 28 in combination with capacitance value 27. Thus, for full scale signal level, the gain-crossover point is extended beyond the frequency $f_2$ to the higher frequency $f_3$ in accordance with one aspect of the present invention and is effectively a single pole system providing good loop stability characteristics and very low-signal frequency measuring capability.

For a signal level less than full scale, the loop gain is decreased by the square-law conversion characteristics of the thermoelement 19. Thus, the effective loop gain of the circuit will be 20 db. lower at a level that is one-tenth of full scale. This has the effect of decreasing the response time of the circuit to applied signal, as indicated in the graph of FIG. 2, by the shift of the asymptote of the loop response characteristic to a lower gain crossover frequency $f_4$. Thus, in order to avoid these changes in response time as a function of operating signal level, the nonlinear gain stage 29 provides a square-law gain characteristic which varies with applied signal level in approximately direct relationship to the signal conversion characteristic of the thermoelement 19. This means that a 20 db. drop in the loop gain due to the square-law conversion characteristic of the thermoelement 19 is compensated for by a gain decrease of 20 db. provided by gain stage 29. This reduction of gain in the feedback path contributed by gain stage 29 at reduced signal level has the effect of shifting the pole frequency $f_o$ of the loop gain to a higher frequency $f_5$. The square-law conversion characteristic of gain stage 29 may be provided by a true square-law device or by a conventional transistor amplifier and diode shaping networks. The speed of response of the circuit to applied signal is therefore unaffected by signal level, as indicated in the graph of FIG. 2, by the asymptotes 36 and 32 for full scale signal level and the asymptotes 35 and 32 for one-tenth scale signal level establishing gain-crossover at the same frequency $f_3$.

Since input signals $e_{in}$ are only applied to the heater of thermoelement 17, signal frequencies well above the pole frequencies $f_o$ and $f_1$ do not affect circuit operation for the thermoelement 17 and the associated circuitry responds only to the full cycle RMS value of such higher frequency signals to produce a representative DC output $e_{out}$. The present circuit thus provides a DC output that is accurately proportional to the true RMS value of an input signal in a measurement period that is unaffected by signal level for low frequencies of about 0.01 hertz to frequencies of the order of several hundred megahertz and for signal levels from full scale down to levels below one-tenth of full scale.

I claim:

1. Signal translating circuit comprising:
a pair of thermoelements, each having a heater for receiving applied signal and each producing an electrical signal related to the temperature of the heater by a signal translating characteristic that is nonlinearly related to operating signal level;
an amplifier having an input circuit and an output circuit;
means connected to the heater of one of the thermoelements for applying input signal thereto;
means connecting the heater of the other thermoelement to receive signal appearing at the output circuit of said amplifier;
circuit means connected to the output circuit of said amplifier and having a characteristic of signal transfer therethrough which varies substantially in direct relationship to the signal translating characteristic of a thermoelement in response to the level of signal received from the output circuit of said amplifier; and
means connected to said circuit means and to said thermoelements for applying to the input circuit of said amplifier the combination of signals from said thermoelements and said circuit means for producing at the output of said amplifier a signal which is related by a substantially linear signal translating characteristic to the RMS value of signal applied to the heater of said one thermoelement, whereby the response speed of the signal translating circuit to changes in applied signal is substantially independent of applied signal level.

2. Signal translating circuit as in claim 1 wherein:
the signals from said thermoelements are applied to the input circuit of said amplifier in polarity opposition; and
the signal from said circuit means is applied to the input circuit of said amplifier with the same polarity as signal applied thereto from said one of the thermoelements.

3. Signal translating circuit as in claim 2 wherein:
said circuit means includes reactance means coupled to said circuit means for applying the signal therefrom to the input circuit of said amplifier for enhancing the signal frequency response characteristic of the translating circuit.

4. Signal translating circuit as in claim 3 wherein:
said reactance means includes a capacitor connected to apply the signal from said circuit means to the input circuit of said amplifier.

* * * * *

UNITED STATES PATENT OFFICE
CERTIFICATE OF CORRECTION

Patent No. 3,624,525 Dated November 30, 1971

Inventor(s) William G. Smith

It is certified that error appears in the above-identified patent and that said Letters Patent are hereby corrected as shown below:

Column 1, lines 54-55, after "Dec. 16, 1968," cancel "now issued as U. S. Pat. No. 3,535,523" and substitute -- now abandoned, --.

Signed and sealed this 25th day of April 1972.

(SEAL)
Attest:

EDWARD M. FLETCHER, JR.
Attesting Officer

ROBERT GOTTSCHALK
Commissioner of Patents